(12) United States Patent
Schmid et al.

(10) Patent No.: US 7,323,974 B2
(45) Date of Patent: Jan. 29, 2008

(54) METHOD AND ARRANGEMENT FOR SUPPRESSING INCORRECT MESSAGES IN MONITORING SYSTEMS

(75) Inventors: Dietmar Schmid, Villmar (DE); Raphael Skorupa, Bad Homburg (DE)

(73) Assignee: Siemens Aktiengesellschaft, München (DE)

(*) Notice: Subject to any disclaimer, the term of this patent is extended or adjusted under 35 U.S.C. 154(b) by 84 days.

(21) Appl. No.: 10/542,210

(22) PCT Filed: Jun. 1, 2004

(86) PCT No.: PCT/EP2004/050980

§ 371 (c)(1),
(2), (4) Date: Jul. 14, 2005

(87) PCT Pub. No.: WO2005/000653

PCT Pub. Date: Jan. 6, 2005

(65) Prior Publication Data

US 2006/0125611 A1   Jun. 15, 2006

(30) Foreign Application Priority Data

Jun. 30, 2003   (DE) ............................. 103 29 512

(51) Int. Cl.
*B60Q 1/00* (2006.01)

(52) U.S. Cl. .................. 340/438; 340/439; 340/425.5; 340/441; 340/635; 701/46; 710/11; 710/14; 710/31; 710/33

(58) Field of Classification Search ............... 340/438, 340/439, 635, 441, 425.5; 235/375, 376, 235/380, 383; 701/46; 710/11, 14, 31, 33
See application file for complete search history.

(56) References Cited

U.S. PATENT DOCUMENTS

| 5,070,832 | A  | * | 12/1991 | Hapka et al. ............ 123/198 D |
| 5,243,324 | A  | * | 9/1993 | Bober ......................... 340/439 |
| 5,805,056 | A  | * | 9/1998 | Mueller et al. ......... 340/426.24 |
| 5,867,091 | A  |   | 2/1999 | Chard |
| 6,429,845 | B1 | * | 8/2002 | Unseld et al. ............... 345/618 |
| 6,584,388 | B2 | * | 6/2003 | Schubert et al. .............. 701/46 |
| 6,606,670 | B1 | * | 8/2003 | Stoneking et al. ............ 710/14 |
| 2004/0090323 | A1 | | 5/2004 | Bieringer et al. |

FOREIGN PATENT DOCUMENTS

| EP | 0 577 045 B1 | 1/1994 |
| WO | WO/03/039929 A1 | 5/2003 |

\* cited by examiner

*Primary Examiner*—Hung Nguyen
(74) *Attorney, Agent, or Firm*—Cohen Pontani Lieberman & Pavane LLP

(57) ABSTRACT

The invention relates to a method and to an arrangement for eliminating false messages in monitoring systems for electronic devices, especially for sensor circuits in motor vehicles. According to the inventive method, error messages increment a counter and an alarm is triggered when a predetermined position on the counter is reached.

6 Claims, 2 Drawing Sheets

METHOD AND ARRANGEMENT FOR SUPPRESSING INCORRECT MESSAGES IN MONITORING SYSTEMS

CROSS-REFERENCE TO RELATED APPLICATION

This is a U.S. national stage of application No. PCT/EP2004/050980, filed on 1 Jun. 2004. Priority is claimed on the following application(s): Country: Germany, Application No.: 103 29 512.7, Filed: 30 Jun. 2003.

BACKGROUND OF THE INVENTION

The invention relates to a method and an arrangement for suppressing incorrect messages in monitoring systems for electronic devices, in particular for sensor circuits for motor vehicles.

For safety reasons, monitoring systems are frequently used for electronic devices in which an incorrect output variable which is caused by a fault in the device can bring about hazards. It is therefore necessary to avoid faults in sensor circuits for motor vehicles resulting in hazardous driving situations, for example if a rotational speed sensor signals a high rotational rate while the vehicle is maintaining its course. However, other hazards and at least operational faults may occur as a result of incorrect messages. Incorrect messages may be caused, for example, by brief disruptions, in particular voltage peaks, which are interpreted by monitoring systems as faults without them leading to falsification of the output variable of the device.

SUMMARY OF THE INVENTION

An object of the present invention is to largely prevent incorrect messages so that as far as possible only genuine faults lead to an alarm, which is then indicated or can be fed to a superordinate system to ignore the output variable, and to ensure that an alarm is triggered quickly when there are a plurality of input variables.

This object is achieved according to the invention in that fault messages are derived using a program running on a processor if one of the input variables to be monitored exceeds respective limiting values which are predefined for it, in that a respective counter is incremented by the fault messages, in that the counter reading is checked to determine whether at least one fault message is present, and in that, if this is the case, a further check is carried out in advance for the relevant input variable, in that the fault messages each increment a counter, and in that an alarm is not triggered until a predefined counter reading is reached.

The size of the increments and, if appropriate, of the decrements and the predefined counter reading may be preselectable, and the triggering of an alarm can be adapted individually to the type of respective fault message. This particular embodiment is preferably implemented by the preselectable variables being read out from a nonvolatile memory when the device is switched on.

In devices which are to be monitored it is generally expedient to monitor a plurality of variables, referred to below as input variables with respect to the method according to the invention. For this purpose, in the method according to the invention there is provision for fault messages which each increment a counter to be derived from a plurality of input variables to be monitored, and for the size of the increments and, if appropriate, of the decrements, the predefined counter reading and limiting values of the variable to be respectively monitored to be preselectable for each of the input variables to be monitored.

In the case of devices which are relevant to safety it is frequently necessary to react very quickly to a fault message. The checking of the fault messages with the method according to the invention can, however, take longer than necessary, in particular when there are a plurality of input variables to be monitored, due to the finite running time of the program in the processor. This applies in particular if a plurality of incrementations are necessary up to the point where the predefined counter reading is reached, in order to avoid incorrect messages.

In one development of the method according to the invention the triggering of an alarm is speeded up significantly in that fault messages are derived using a program running on a processor if one of the input variables to be monitored exceeds respective limiting values which are predefined for it, in that the respective counter is incremented by the fault messages, in that the counter reading is checked to determine whether at least one fault message is present, and in that, if this is the case, a further check is carried out in advance for the relevant input variable. This is achieved in that the monitoring of a variable which has already had attention drawn to it by a fault message is carried out in a prioritized fashion in terms of time. If a plurality of such fault messages are present, the further checking will preferably be carried out in such a way that when fault messages are present for a plurality of input variables the advance further checking of these input variables is carried out according to a previously defined priority list.

The invention also comprises an arrangement for suppressing fault messages in monitoring systems for electronic devices, in particular for sensor circuits for motor vehicles, in which it is provided that in a microprocessor it is possible to run a program with which fault messages are derived if one of the input variables to be monitored exceeds respective limiting values which are predefined for it. A respective counter is incremented by the fault messages. The counter reading is checked to determine whether at least one fault message is present, and in that, if this is the case, further checking is carried out in advance for the relevant input variable. An alarm is not triggered until at least one of the counters reaches a respectively predefined counter reading.

BRIEF DESCRIPTION OF THE DRAWINGS

The invention permits numerous embodiments. One of these is illustrated schematically in the drawing by means of a plurality of figures, and described below. In the drawing.

DETAILED DESCRIPTION OF THE PRESENTLY PREFERRED EMBODIMENTS

Figure 1:
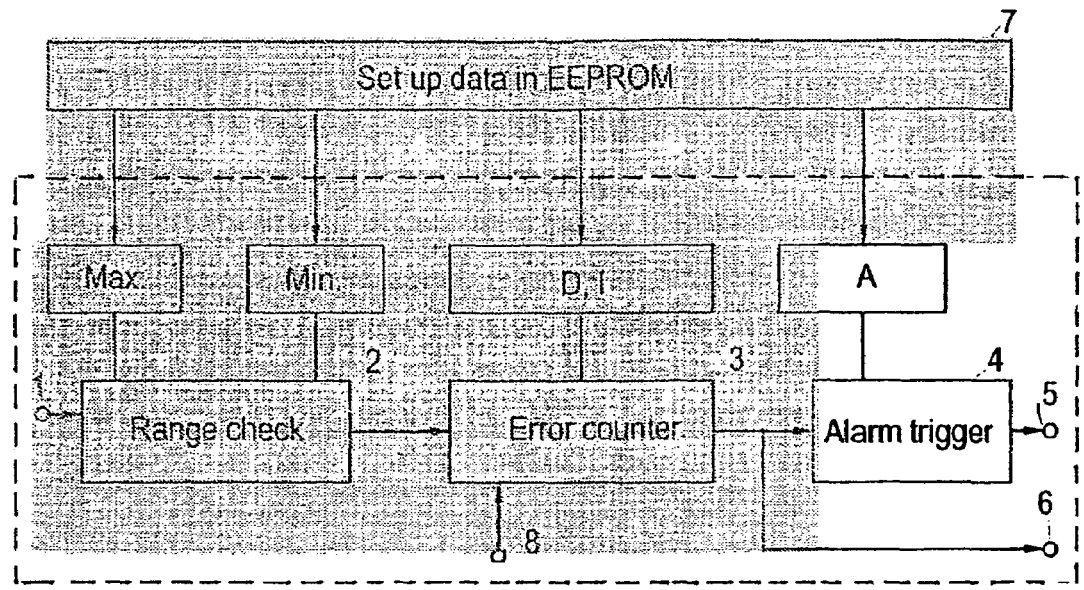
FIG. 1 is a block diagram of the exemplary embodiment.

For the sake of simplicity, the arrangement according to FIG. 1 is illustrated only for an input variable which is to be monitored and which is present at an input 1. At first, checking is carried out at range check 2 to determine whether the input variable is in a permissible range between mm and max. If this is not the case, a fault message is passed on to a fault counter 3, also simply referred to below as counter. If a fault message is present, the counter 3 is incremented by one increment I which is predefined as a number of counting steps. If no fault message is present in the respective time period (program run), the counter 3 is decremented by one decrement D which is also predefined as a number of counter steps. If the counter reading reaches a predefined threshold value A, an alarm is triggered in an alarm trigger 4 and output via an output 5. The respective counter reading can be read out via a monitoring output 6.

When the device is switched on, the predefined values are read out from an EEPROM 7, said values being specifically the maximum permissible value max and the minimum permissible value min of the input signal, the number of counting steps I and D and the threshold value A. In addition, the counter 3 is reset by means of an input 8. The part of FIG. 1 which is outlined by dashed lines is present once for each input variable and is preferably implemented by a program for a processor, with the predefined variables being stored individually for each input variable in the EEPROM 7 and being loaded into the working memory of the processor when the device is switched on. The outputs 5, 6 which are assigned to the alarm triggers for the various input variables can be combined in a suitable way.

Threshold values may be used to suppress the alarm in a selective way when specific input variables to be monitored exceed allowable values. The threshold value may be set to "0" for these input variables. This specification of a threshold value is interpreted as a command with which the correspondingly configured alarm triggers are blocked. The fault counter for checking these input variables thus has no effect on the triggering of the alarm.

Figure 2A:
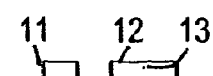
FIGS. 2a, 2b, and 2c are time diagrams for various signals in the block diagram illustrated in FIG. 1.

FIG. 2a shows an exemplary profile of the output variable of the range check 2 in line a. As an example it will be assumed that after a fault-free time a fault message 11 occurs and then in turn a time period without faults and then two fault messages 12, 13 in succession.

Figure 2B:
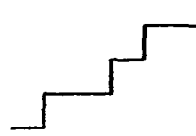

Line b of FIG. 2b shows the profile of a reading of error counter 3 for the case in which in each case a fault message 11, 12, 13 increments the counter by an increment I of one counting step, and in which the absence of a faults message decrements the counter 3 by D=0. With this setting, no fault messages are therefore "forgotten" again so that the absolute number of fault messages remains stored in the error counter 3 until the next reset (switching on of the device or switching off). If the threshold value is therefore set to 3 in the case illustrated in FIG. 2b, an alarm is triggered on the basis of the fault message 13 because the counter reaches the value of 3 after the fault message 13 occurs.

Figure 2C:
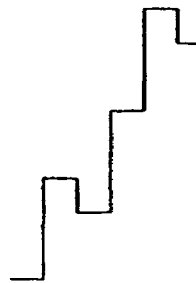

FIG. 2c relates in turn to the occurrence of fault messages 11, 12, 13 according to FIG. 2a, but I is set to 3 and D to 1. As a result of fault messages 11, 12, 13 occurring in close succession, the counter reading quickly rises, and when fault messages are absent it drops more slowly. As a result, accumulations of fault messages lead to an alarm if the threshold value A is set higher than I.

Figure 3:
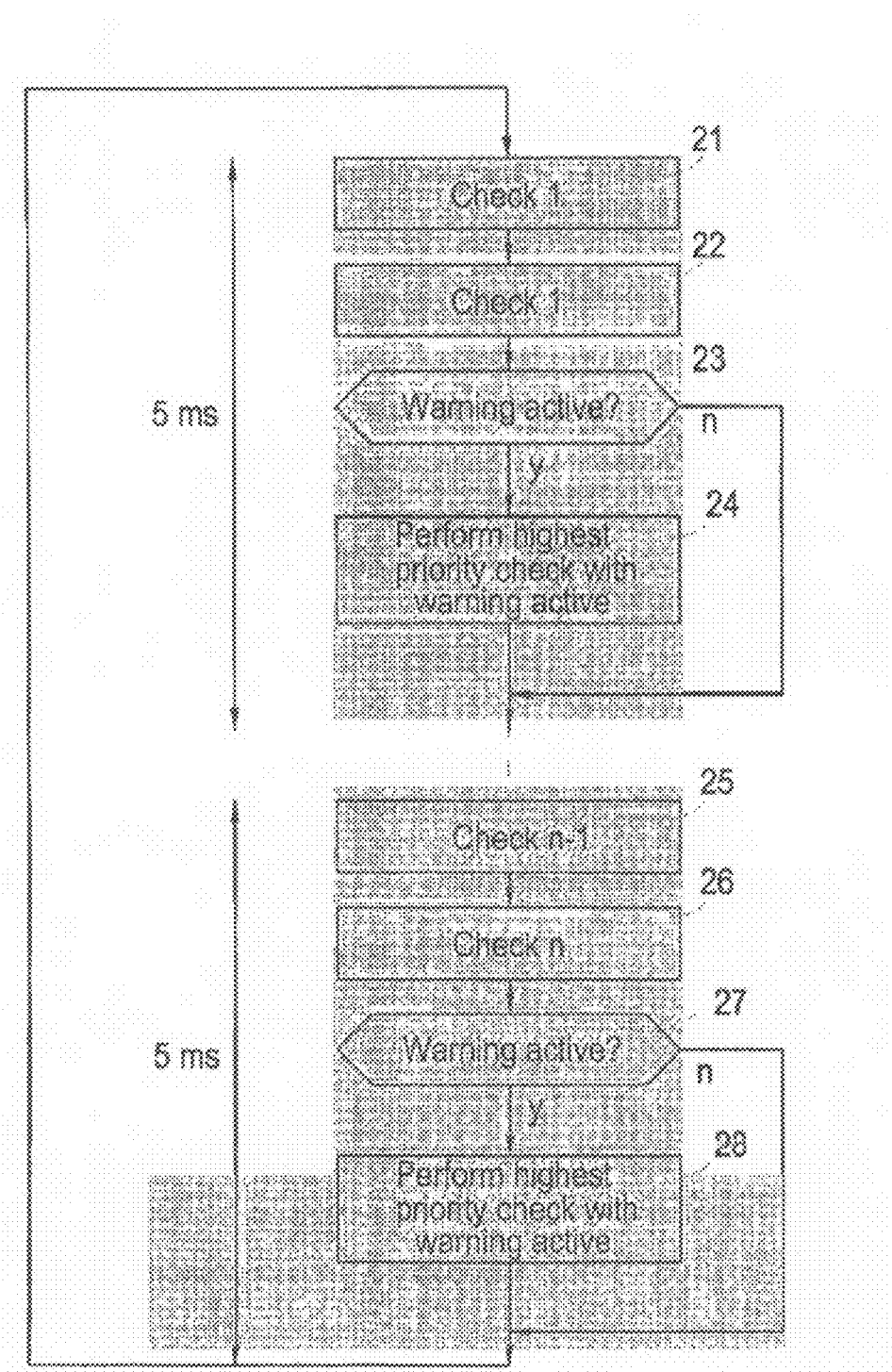
FIG. 3 is a flowchart of a program which executes the method according to the invention.

The program illustrated in part in FIG. 3 runs through a loop during which all the input variables from 1 to n are checked. In the program steps 21, 22, the first two input variables are checked, the respective counter is incremented or decremented and the counter reading is compared with the associated threshold value A. There is then an interrogation to determine whether one of the input variables has incremented the counter 3 as a result of the limiting values max and min (FIG. 1) being respectively exceeded or undershot, which is considered to be a warning. If this is not the case, after the branching point 23 the program continues with checking further input variables. However, if at least one warning is present, the relevant input variables in the program part 24 are checked again. This takes place according to a previously defined priority sequence.

If it is detected during one of the checks 21, 22, 24 that the alarm threshold A has been reached, an alarm is triggered, which is not illustrated in particular in FIG. 3 for the sake of clarity. The last two input variables (n-1) and n are checked at 25 and 26, after which in turn branching takes place as a function of whether these input variables have lead to a warning. If this is the case, the relevant input variables are checked again at 28. The program is then repeated starting at 21.

The described checking of two input variables including the immediate further checking at 24 takes approximately 5 ms when a program is carried out in practice. If a maximum reaction time for a fault message of 25 ms is allowed, ten input variables can be checked. The order of the checks can also be changed depending on the particular requirements. For example, three or more input variables can thus be checked before the system continues to immediate further checking of those input variables for which a warning is active. In other cases it is also possible to provide that after each input variable has been checked it is decided whether said input variable is to be checked once more immediately afterward.

What is claimed is:

1. A method for suppressing incorrect messages in a monitoring system for sensor circuits for motor vehicles, including using a program running on a processor to perform the steps of:

monitoring at least one input variable and checking whether the at least one monitored input variable exceeds a limiting value defined for the at least one input variable;

deriving a fault message when the at least one input variable being monitored exceeds the limiting value defined for that at least one input variable;

incrementing a counter respectively associated with the at least one input variable in response to the fault message by a first predetermined number of counter steps;

checking the counter to determine whether at least one fault message is present for one of the at least one input variable;

decrementing the counter for the at least one input variable by a second predetermined number of counter steps when a time period elapses without the occurrence of a fault message for that at least one input variable;

performing the step of monitoring and checking for the one of the at least one input variable if it is determined that at least one fault message is present for the one of the at least one input variable in said step of checking the counter; and triggering an alarm only if the counter reaches an alarm limit for the at least one input variable.

2. The method of claim 1, wherein the size of the increment and the value of the alarm limit are predefined for the at least one input variable.

3. The method of claim 2, wherein the size of the increment and the value of the alarm limit are read from a nonvolatile memory when the process is initiated.

4. The method of claim 1, wherein fault messages are derived for each one of the at least one input variables to be monitored, wherein the size of the increments, the value of the alarm limits, and the limiting values are preselected for the each one of the at least one input variables.

5. The method of claim 1, wherein the step of performing the step of monitoring and checking is performed according to a priority list if it is determined that a fault message is present for more than one of the at least one input variable.

6. An arrangement for suppressing incorrect messages in a monitoring system for sensor circuits for motor vehicles, comprising a microprocessor running a program for executing the steps of:

monitoring at least one input variable and checking whether the at least one monitored input variable exceeds a limiting value defined for the at least one input variable;

deriving a fault message when the at least one input variable being monitored exceeds the limiting value defined for that at least one input variable;

incrementing a counter respectively associated with the at least one input variable in response to the fault message by a first predetermined number of counter steps;

checking the counter to determine whether at least one fault message is present for one of the at least one input variable;

decrementing the counter for the at least one input variable by a second predetermined number of counter steps when a time period elapses without the occurrence of a fault message for that at least one input variable;

performing the step of monitoring and checking for the one of the at least one input variable if it is determined that at least one fault message is present for the one of the at least one input variable in said step of checking the counter; and triggering an alarm only if the counter reaches an alarm limit for the at least one input variable.

* * * * *